(12) United States Patent
Davis et al.

(10) Patent No.: US 6,940,731 B2
(45) Date of Patent: Sep. 6, 2005

(54) INTEGRATED DRIVE PANEL FOR A COMPUTER CASE

(75) Inventors: David R. Davis, Jefferson, SD (US); Vernon D. Erickson, Dakota Dunes, SD (US); Jon Smedley, El Paso, TX (US); Richard A. Gibson, El Paso, TX (US)

(73) Assignee: Gateway Inc., Irvine, CA (US)

( * ) Notice: Subject to any disclaimer, the term of this patent is extended or adjusted under 35 U.S.C. 154(b) by 256 days.

(21) Appl. No.: 10/326,715

(22) Filed: Dec. 19, 2002

(65) Prior Publication Data

US 2004/0120107 A1 Jun. 24, 2004

(51) Int. Cl.[7] .............................. H05K 7/14; H05K 7/18
(52) U.S. Cl. ....................... 361/801; 361/756; 361/800; 361/818; 361/816; 174/51; 174/35 R; 312/223.2
(58) Field of Search ................................ 361/801, 816, 361/818, 800, 752, 797, 759, 754, 732, 726, 747, 756, 727, 686, 802; 439/377; 174/35 R, 51, 35 MS; 312/223.2

(56) References Cited

U.S. PATENT DOCUMENTS

| | | | |
|---|---|---|---|
| 6,195,262 B1 | * | 2/2001 | Bodette et al. .............. 361/752 |
| 6,442,020 B1 | * | 8/2002 | Liu et al. ..................... 361/683 |
| 6,483,024 B1 | * | 11/2002 | Smithson et al. ...... 174/35 GC |
| 6,652,048 B2 | * | 11/2003 | Chen ........................ 312/223.2 |

\* cited by examiner

Primary Examiner—Randy Gibson
Assistant Examiner—Hung S. Bui
(74) Attorney, Agent, or Firm—Kevin E. West; Suilar West Swartz PC LLO

(57) ABSTRACT

An integrated drive panel for a peripheral/drive bay within the case of a computer or like electronic device comprises a cover assembly having an integral EMI shield. The integrated drive panel does not require removal of the front bezel of the computer case or access to the peripheral/drive bay from inside the computer case during installation and removal.

36 Claims, 5 Drawing Sheets

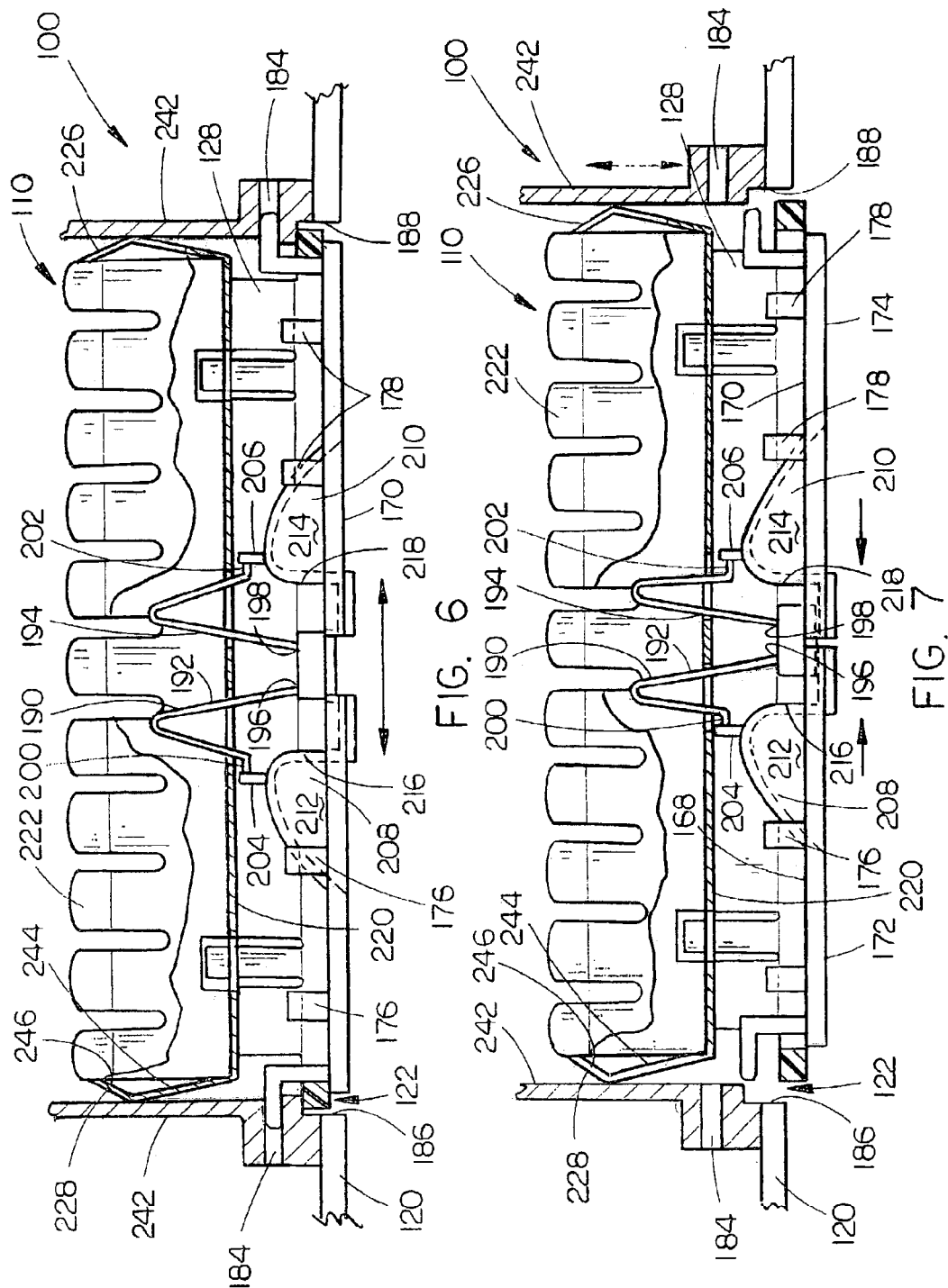

INTEGRATED DRIVE PANEL FOR A COMPUTER CASE

FIELD OF THE INVENTION

The present invention generally relates to computers and similar electronic devices having enclosures or cases which include bays for receiving interchangeable peripheral devices or drives including, but not limited to, floppy disk drives, optical disc drives, tape drives, and particularly, to an integrated drive panel for enclosing an empty bay within the case of such a device.

BACKGROUND OF THE INVENTION

Many computers employ enclosures or cases which include peripheral/drive bays for receiving interchangeable peripheral drives and drives such as floppy disk drives, optical disk drives, tape drives, or the like. Typically, these bays can be accessed through an opening in the front wall, or bezel, of the computer case. When one or more bays within the computer are empty (i.e., do not contain a peripheral device or drive), a cover or panel is provided for covering the opening to the bay to prevent environmental contaminants from entering the computer. Additionally, an EMI (Electromagnetic Interference) shield may be provided within the bay beneath the cover. The EMI shield is grounded to the metal chassis of the computer case to prevent EMI emissions through the peripheral/drive bay opening.

In present computers, installation and removal of the cover and EMI shield is time consuming and difficult, increasing manufacturing costs for the computer when peripheral devices or drives must be installed in the computer, and frustrating the user of the computer who wishes to install peripheral devices or drives after manufacture. When installing a peripheral device or drive, the cover and EMI shield must first be removed to provide access to the bay. Typically, this process requires removal of the front bezel or cover of the computer case. Removal of the EMI shield may also require that the computer case be opened to provide access to the bay from inside the case. Moreover, the EMI shield is typically a stamped metal part and may have sharp edges which could cut the hands of the installer during its removal or installation. When the peripheral device is again removed from a bay of the computer case, the front panel and EMI shield must be reinstalled requiring that the front bezel be removed and/or the computer case be opened to provide access to the bay.

Consequently, it would be desirable to provide a cover for enclosing a peripheral/drive bay within the case of a computer or similar electronic device, wherein the cover includes an integral EMI shield so that the cover and EMI shield can be easily installed without requiring removal of the front bezel of the computer case or access to the bay from inside the computer case for installation and removal.

SUMMARY OF THE INVENTION

Accordingly, the present invention is directed to an integrated drive panel comprising a cover assembly having an integral EMI shield for a peripheral/drive bay within the case of a computer or like electronic device. The integrated drive panel does not require removal of the front bezel of the computer case or access to the peripheral/drive bay from inside the computer case during installation and removal.

In exemplary embodiments, the integrated drive panel includes a cover assembly for at least partially covering the peripheral/drive bay when the peripheral/drive bay is empty and an EMI shield assembly coupled to the cover assembly for reducing EMI emissions through the peripheral/drive bay. The cover assembly engages the computer case for holding the EMI shield within the peripheral/drive bay. In one embodiment, the cover assembly includes a frame member having one or more panel cover subassemblies coupled thereto which are slidable on the frame member between a latched position wherein the panel engages the computer case and an unlatched position wherein the integrated drive panel may be removed from the drive bay.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 6 is a partial cross-sectional top plan view illustrating the integrated drive panel shown in FIGS. 1 and 4, showing the integrated drive panel engaged within the slot or bay of the computer case; and FIG. 7 is a partial cross-sectional top plan view illustrating the integrated drive panel shown in FIGS. 1 and 4, showing the integrated drive panel engaged within the slot or bay of the computer case.

DETAILED DESCRIPTION OF THE INVENTION

Reference will now be made in detail to the presently preferred embodiments of the invention, examples of which are illustrated in the accompanying drawings.

Figure 1:
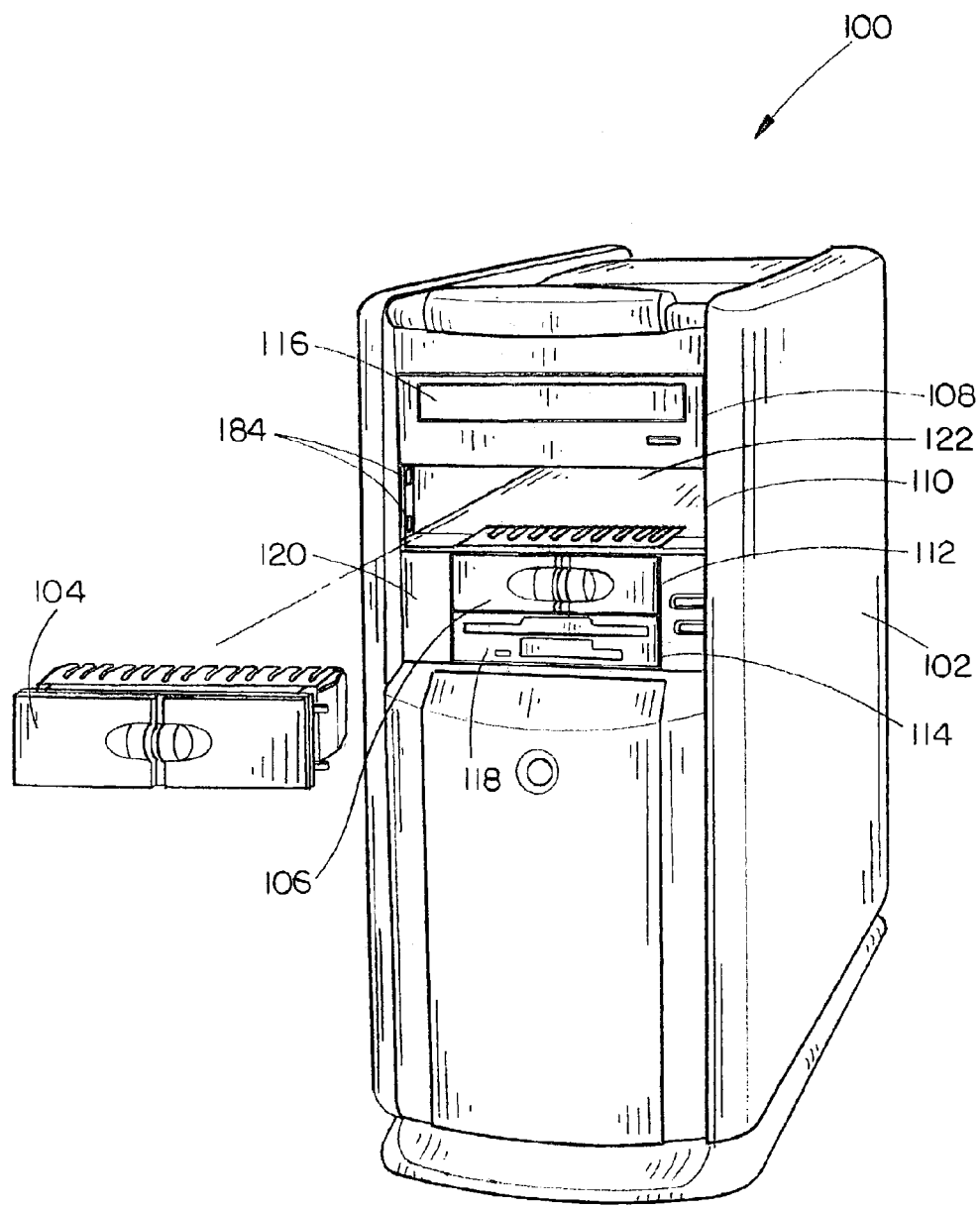
FIG. 1 is an isometric view illustrating a computer having a case employing integrated drive panels in accordance with an exemplary embodiment of the present invention.
Figure 2:
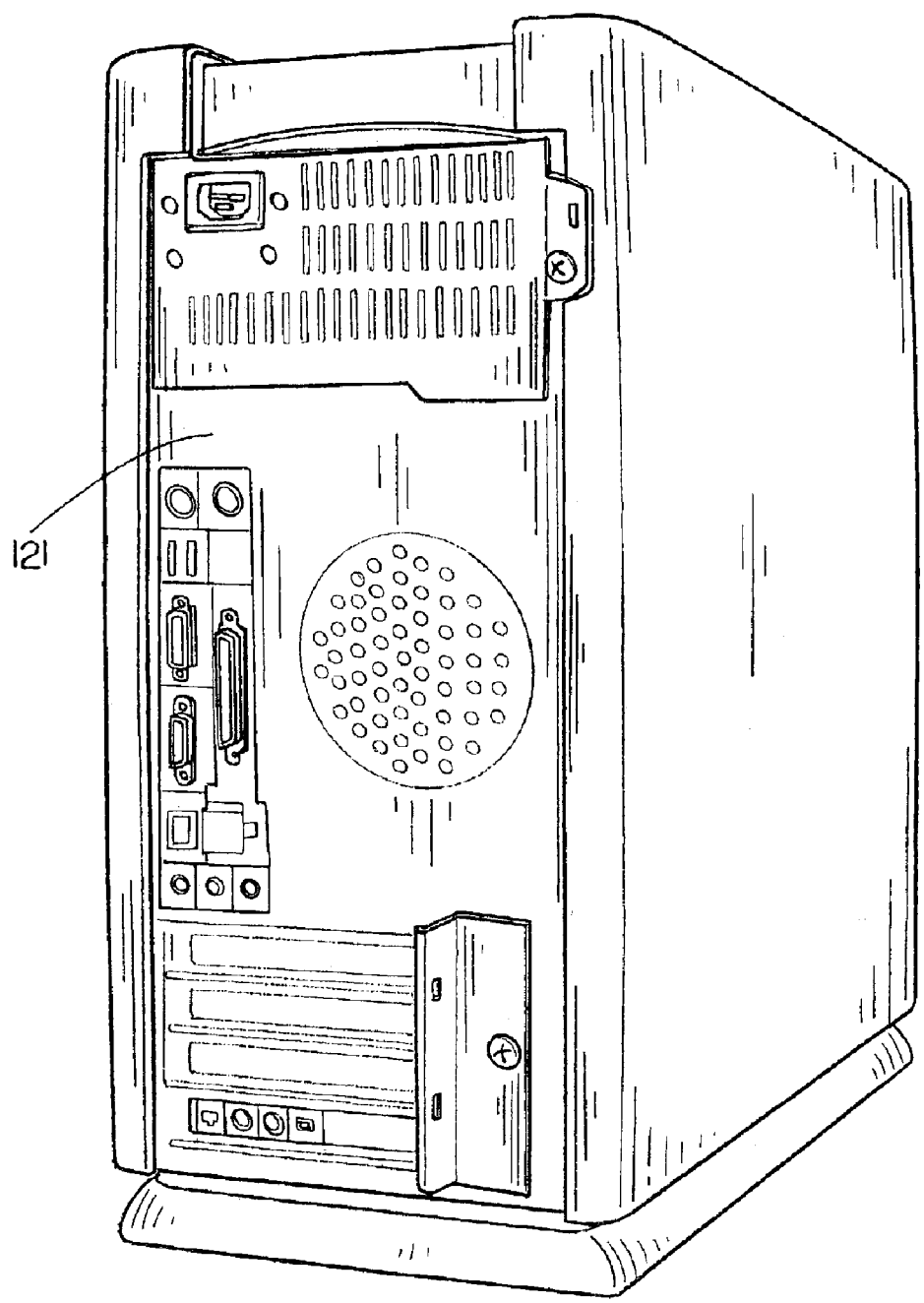
FIG. 2 is a side elevation view further illustrating the computer shown in FIG. 1.
Figure 3:
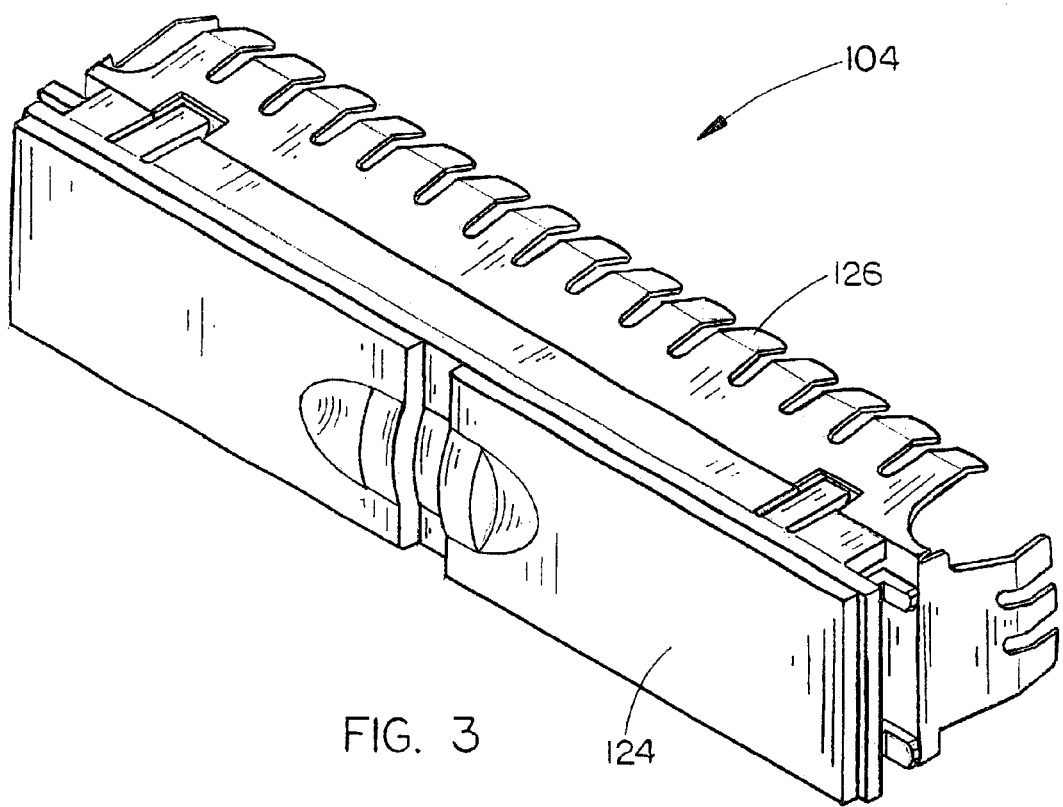
FIG. 3 is an isometric view illustrating an integrated drive panel of the computer case shown in FIG. 1, wherein the integrated drive panel is sized to cover a 5¼ inch bay.
Figure 4:
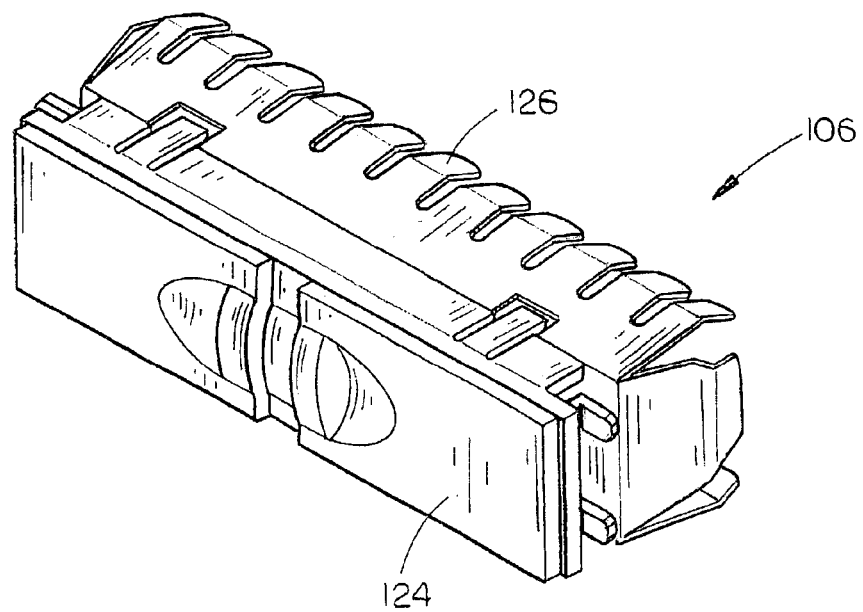
FIG. 4 is an isometric view illustrating an integrated drive panel of the computer case shown in FIG. 1, wherein the integrated drive panel is sized to cover a 3½ inch slot or bay.

FIGS. 1 and 2 illustrates a computer 100 having a case 102 employing integrated drive panels 104 & 106 in accordance with an exemplary embodiment of the present invention. Computer case 102 includes peripheral/drive bays 108, 110, 112 & 114 in which peripheral devices or drives such as floppy disk drives, optical disc drives, tape backup drives, or the like may be received. For example, in the embodiment illustrated, computer case 102 includes two peripheral/drive bays 108 & 110 sized to receive standard 5¼ inch peripheral devices or drives such as optical disc drive 116 and two peripheral/drive bays 112 & 114 sized to receive standard 3½ inch peripheral devices or drives such as 3½ inch floppy disk drive 118. However, it will be appreciated that computer case 102 may include a lesser or greater number of peripheral/drive bays capable of receiving either 5¼ inch or 3½ inch peripheral devices or drives depending on design requirements of computer 100. Moreover, it is contemplated that peripheral/drive bays may be provided that are designed to receive peripheral devices or drives having non-standard sizes (i.e., other than 5¼ inch or 3½ inch peripheral devices or drives) without departing from the scope and intent of the present invention.

Computer case 102 further includes front bezel 120 having an opening 122 formed therein for providing access to peripheral/drive bays 108–114. Preferably, front bezel 120 is oriented generally parallel to and apart from a back panel 121 of computer case 102, which provided for connection of the power cord for computer 100, access ports for expansion card slots coupled to the computer bus, connectors for external devices such as a mouse, keyboard, or printer, or the like. In the embodiment illustrated, a single opening 122 provides access to all drive bays within the computer case 102. However, it will be appreciated that bezel 120 may alternatively be provided with separate openings 122 for each drive bay or for two or more groups of drive bays (e.g., a separate opening 102 for 5¼ inch peripheral/drive bays 108 & 110 and for 3½ inch peripheral/drive bays 112 & 114). Further, the position of peripheral/drive bays 108–114 within computer case 102, and thus the position of opening 122 in bezel 120, is illustrative of one exemplary embodiment only, and is not meant to limit the application of the present invention to the embodiment shown in FIGS. 1 and 2.

In accordance with the present invention, integrated drive panels 104 & 106 are provided for covering portions of opening 122 over empty peripheral/drive bays (i.e., drive bays which do not contain a peripheral device or drive or which contain a peripheral device that does not require access through the front bezel 120 of computer 100). In the embodiment illustrated in FIG. 1, drives 116 and 118 are installed in peripheral/drive bays 108 & 114, respectfully, while 5¼ inch peripheral/drive bay 110 and 3½ inch peripheral/drive bay 112 remain empty. Thus, integrated drive panels 104 & 106 that are sized to cover the portion of opening 122 over 5¼ inch peripheral/drive bay 110 and 3½ inch peripheral/drive bay 112, respectively, are provided so that the empty portions of opening 122 are filled or covered. However, it will be appreciated that the configuration of integrated drive panels in computer 100 is not limited to the embodiment shown. For example, if drives 116 & 118 were removed from computer 100, additional integrated drive panels in accordance with the present invention may be provided for covering the portions of opening 122 over peripheral/drive bays 108 & 114. Further, in embodiments where bezel 120 is provided with separate openings 122 for each peripheral/drive bay or for two or more groups of drive bays (e.g., a separate opening 102 for 5¼ inch peripheral/ drive bays 108 & 110 and for 3½ inch peripheral/drive bays 112 & 114) one or more integrated drive panels may be provided for each opening 122. Moreover, in embodiments where peripheral/drive bays are provided that are designed to receive peripheral devices or drives having non-standard sizes (i.e., other than 5¼ inch or 3½ inch peripheral devices or drives) integrated drive panels may be provided that are sized and/or shaped accordingly without departing from the scope and intent of the present invention.

Referring generally now to FIGS. 3 through 7, integrated drive panels in accordance with an exemplary embodiment of the present invention are described in greater detail. Integrated drive panels 104 (FIG. 3) and 106 (FIGS. 4, 5, 6 and 7) each include a cover assembly 124 and an EMI shield assembly 126. Cover assembly 124 engages bezel 120 along edges of opening 122 for holding the EMI shield 126 within peripheral/drive bay 110 (or peripheral drive bay 110). Cover assembly 124 also fills or encloses a portion of opening 122 over a respective peripheral/drive bay (peripheral/drive bay 110 is shown) to at least partially cover peripheral/drive bay 110 when peripheral/drive bay 110 is empty.

Figure 5:
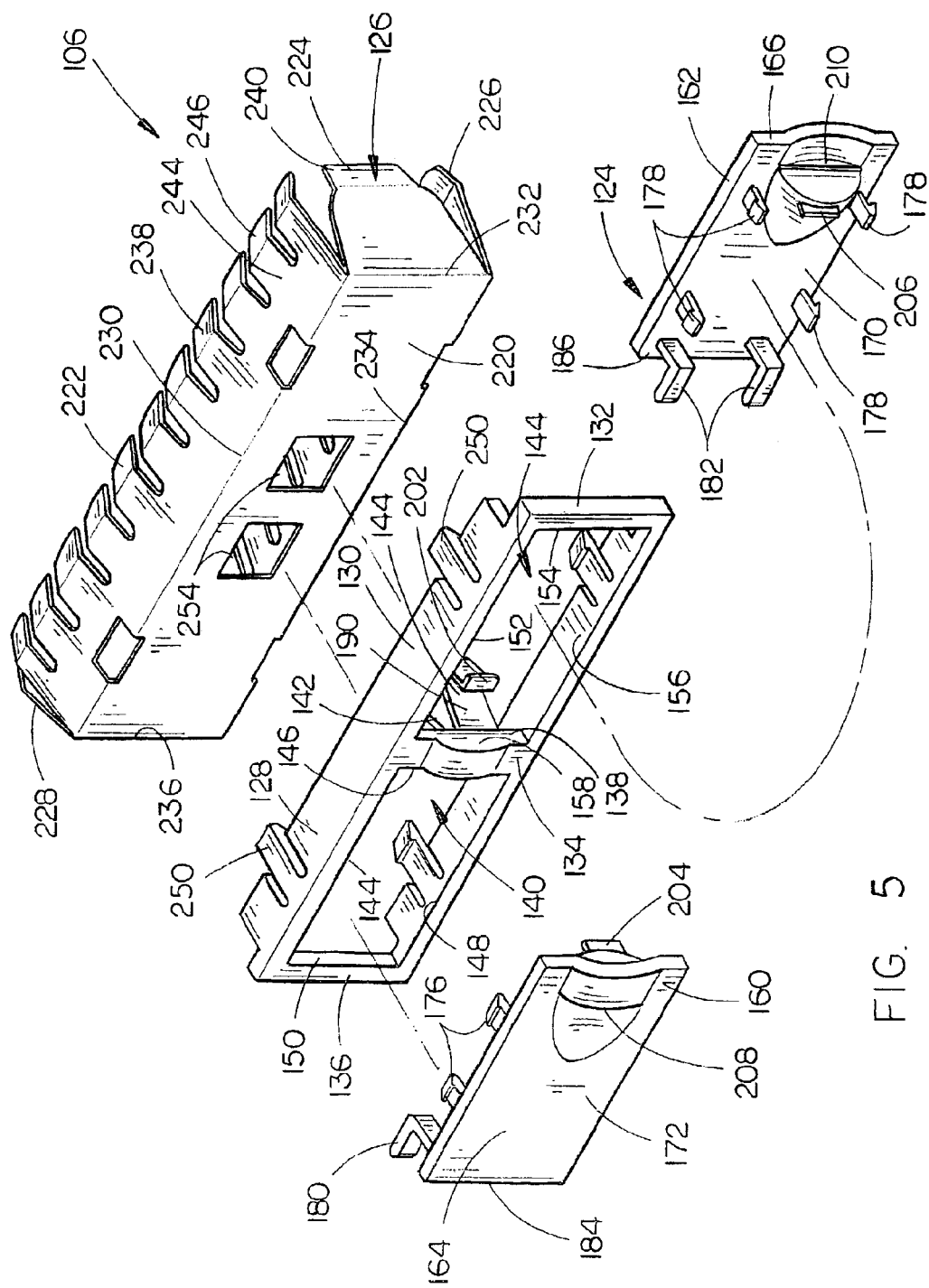
FIG. 5 is an exploded isometric view further illustrating components of the integrated drive panel shown in FIGS. 1 and 4.

As shown in FIGS. 5, 6 and 7, cover assembly 124 includes a generally rectangular frame member 128 having a first, second, third and fourth sides 130, 132, 134 & 136 and center portion 138 so that two generally rectangular openings 140 & 142 are formed in frame member 128 having edges 144, 146, 148 & 150 and 152, 154, 156 & 158, respectively. First and second panel cover subassemblies 160 & 162 are coupled to frame member 128 over openings 140 & 142. In the embodiment illustrated, first and second panel cover subassemblies 160 & 162 comprise generally flat, rectangular plates 164 & 166, each having an inner surface 168 & 170 and an outer surface 172 & 174. Clips 176 & 178 extend from inner surfaces 168 & 170 to engage and slide on edges 144 & 148 of opening 140 and edges 152 & 158 of opening 142, respectively. In this manner, first and second panel cover subassemblies 160 & 162 may slide within frame member 128 between a latched position, shown in FIG. 6, wherein first and second panel cover subassemblies 160 & 162 are moved away from each other to engage bezel 120 and an unlatched position, shown in FIG. 7, wherein first and second panel cover subassemblies 160 & 162 are moved toward each other so that drive panel 106 may be removed from its peripheral/drive bay 112.

Generally L-shaped tabs 180 & 182 extend from inner surfaces 168 & 170 of first and second panel cover subassemblies 160 & 162 along outer edges 184 & 186 of the panel cover subassemblies. Preferably, when first and second panel cover subassemblies 160 & 162 are in the latched position, shown in FIG. 6, tabs 180 & 182 extend past frame member 128 and engage holes 184 formed in bezel 120 along edges 186 & 188 of opening 122 for securing cover assembly 124 to bezel 120. When first and second panel cover subassemblies 160 & 162 are in the unlatched position, shown in FIG. 7, tabs 180 & 182 are withdrawn from holes 184 into frame member 128 allowing drive panel 106 to be removed from peripheral/drive bay 112.

In embodiments of the invention, a spring member 190 is provided for biasing first and second panel cover subassemblies 160 & 162 to the latched position, shown in FIG. 6. In the exemplary embodiment shown in FIGS. 5, 6 and 7, spring member 190 comprises a pair of generally V-shaped resilient members 192 & 194 having inner ends 196 & 198 affixed to the center portion 134 of frame member 128 and outer ends 200 & 202 that engage tabs 204 & 206 extending from inner surfaces 168 & 170 of first and second panel cover subassemblies 160 & 162. Preferably, generally V-shaped resilient members 192 & 194 apply an outward force against tabs 204 & 206 biasing the panel cover subassemblies to the latched position.

In exemplary embodiments, frame member 128, first and second panel cover subassemblies 160 & 162 of cover assembly 120 are fabricated to substantially match front bezel 120. For example, in the embodiment illustrated, front bezel 120, frame member 128 and first and second panel cover subassemblies 160 & 162 may be formed of a non-metallic material such as a plastic, composite, or the like. Preferably, spring member 190 is also fabricated of a non-metallic material such as a plastic, a composite material or the like. For example, in one embodiment, spring member 190 may be formed of the same plastic material as frame member 128 and first and second panel cover subassemblies 160 & 162.

First and second panel cover subassemblies 160 & 162 are provided with handles 208 & 210 which allow a user or installer to grasp the panel cover subassemblies to slide the panel cover subassemblies to the unlatched position shown in FIG. 7. In the exemplary embodiment illustrated, handles 208 & 210 comprise dimples 212 & 214 formed in the front surfaces 172 & 174 of each panel 160 & 162. Dimples 212 & 214 include flattened surfaces 216 & 218 positioned adjacent to the inner edges 220 & 222 of first and second panel cover subassemblies 160 & 162. To slide first and second panel cover subassemblies 160 & 162 to the unlatched position, the user or installer inserts his or her thumb and forefinger into dimples 212 & 214 and squeezes in a pinching motion thereby applying a force to flattened surfaces 216 & 218 to overcome the bias of spring member 190 and slide first and second panel cover subassemblies 160 & 162 inwardly as shown in FIG. 7. The user or installer may then push drive panel 106 into peripheral/drive bay 112 or pull drive panel 106 from peripheral/drive bay 112.

In the embodiment shown, cover assembly 124 is substantially flush with front bezel 120 when drive panel 106 is installed in peripheral/drive bay 110. First and second panel cover subassemblies 160 & 162 are disposed in the same plane. However, it will be appreciated the shape of the front surfaces 172 & 174 of first and second panel cover subassemblies 160 & 162 may be varied depending on the aesthetic requirements of particular applications without departing from the scope and intent of the present invention.

EMI shield assembly 126 is coupled to the cover assembly for reducing EMI emissions through the peripheral/drive bay. In the embodiment shown in FIGS. 3 through 7, EMI shield assembly 126 comprises a generally rectangular plate portion 220 sized to substantially fill or cover a portion of opening 122 over a respective peripheral/drive bay (e.g., peripheral/drive bay 112). Side portions 222, 224, 226 & 228 are adjoined to plate portion 220 along edges 230, 232, 234 & 236 and extend away from cover assembly 124 into peripheral/drive bay 110 when drive panel 106 is installed therein. In exemplary embodiments, side portions 222, 224, 226 & 228 are formed to include a plurality of fingers 238 & 240 shaped to engage sides or walls 242 of peripheral/drive bay 112 to prevent passage of EMI emissions and to hold drive panel 106 within peripheral/drive bay 112. For example, in the embodiment illustrated, fingers 238 & 240 are formed to have a generally V-shape including an outwardly sloping first face 244 and an inwardly sloping second face 246. Preferably, the inwardly sloping second faces 246 of fingers 240 facilitate insertion of EMI shield assembly 126 through opening 122 in bezel 120. Once inserted, outwardly sloping first faces 244 contact sides 242 of peripheral/drive bay 110, or alternately the fingers of the EMI shield 126 of a second drive panel such as drive panel 112 (see FIG. 1) to reduce EMI emissions through opening 122. In the exemplary embodiment illustrated, EMI shield assembly 126 is fabricated of a spring steel while sides 242 of peripheral/drive 112 are fabricated of a conducting metal, such as steel, or the like, and are coupled to the chassis of computer case 102 (which is also fabricated of a conducting material such as steel, or the like), to ground EMI shield assembly 126 to computer case 102.

In the embodiment shown in FIG. 5, EMI shield assembly 126 is attached to frame member 128 via clips 250 which engage plate portion 220 of EMI shield 126 through apertures 252 formed in side portions 222 & 226 along edges 230 & 234. Additional apertures 254 may be provided in plate portion 220 for the resilient members 192 & 194 of spring member 190.

Referring now to FIGS. 6 and 7, installation and removal of integrated drive panel 104 is described. During installation and removal of drive panel 104 first and second panel cover subassemblies 160 & 162 are slid between a latched position, shown in FIG. 6, wherein first and second panel cover subassemblies 160 & 162 are moved away from each other to engage bezel 120 and an unlatched position, shown in FIG. 7, wherein first and second panel cover subassemblies 160 & 162 are moved toward each other so that drive panel 106 may be removed from its peripheral/drive bay 112.

While first and second panel cover subassemblies 160 & 162 are in the latched position, shown in FIG. 6, tabs 180 & 182 extend past frame member 128 and engage holes 184 formed in bezel 120 along edges 186 & 188 of opening 122 for securing cover assembly 124 to bezel 120. Preferably, spring member 190 biases first and second panel cover subassemblies 160 & 162 to the latched position, holding tabs 180 & 182 in holes 184. To slide first and second panel cover subassemblies 160 & 162 to the unlatched position, the user or installer inserts his or her thumb and forefinger into dimples 212 & 214 and squeezes in a pinching motion thereby applying a force to flattened surfaces 216 & 218 to overcome the bias of spring member 190 and slide first and second panel cover subassemblies 160 & 162 inwardly as shown in FIG. 7. While first and second panel cover subassemblies 160 & 162 are in the unlatched position, shown in FIG. 7, tabs 180 & 182 are withdrawn from holes 184 into frame member 128 allowing drive panel 106 to be removed from peripheral/drive bay 112. The user or installer may then push drive panel 106 into peripheral/drive bay 112 or pull drive panel 106 from peripheral/drive bay 112 through opening 122 in bezel 120. In this manner, integrated drive panel 104 does not require removal of front bezel 120 or access to peripheral/drive bay 112 from inside computer case 102 during installation and removal. Moreover, installation and removal of the integrated drive panel 106 is tool-less and thus does not require the use of tools such as a screwdriver or wrench, or fasteners such as screws, thumbscrews, or the like.

It is believed that the integrate drive panel of the present invention and many of its attendant advantages will be understood by the forgoing description. It is also believed that it will be apparent that various changes may be made in the form, construction and arrangement of the components thereof without departing from the scope and intent of the invention or without sacrificing all of its material advantages. The form herein before described being merely an explanatory embodiment thereof. It is the intention of the following claims to encompass and include such changes.

What is claimed is:

1. An integrated drive panel for a peripheral/drive bay in a computer case, comprising:

a cover assembly for at least partially covering the peripheral/drive bay when the peripheral/drive bay is empty, the cover assembly including a panel cover subassembly slidable between a latched position wherein the panel cover assembly engages the computer case and an unlatched position wherein the integrated drive panel may be removed from the drive bay; and an EMI shield assembly coupled to the cover assembly for reducing EMI emissions through the peripheral/drive bay, wherein the cover assembly engages the computer case for holding the EMI shield within the peripheral/drive bay.

2. The integrated drive panel as claimed in claim 1, wherein the cover assembly comprises:
a frame member;
the panel cover subassembly being coupled to the frame member and slidable on the frame member between the latched position and the unlatched position.

3. The integrated drive panel as claimed in claim 2, wherein the EMI shield is metal and the panel cover subassembly comprises a non-metallic material.

4. The integrated drive panel as claimed in claim 2, wherein the cover assembly further comprises a spring member for biasing the panel cover subassembly to the latched position.

5. The integrated drive panel as claimed in claim 4, wherein the EMI shield is metal, the panel cover subassembly comprises a non-metallic material, and the spring member is formed from said non-metallic material.

6. The integrated drive panel as claimed in claim 2, wherein the panel cover subassembly includes a handle for grasping the panel cover subassembly to slide the panel cover subassembly between the latched and unlatched positions.

7. The integrated drive panel as claimed in claim 6, wherein the handle comprises a dimple formed in the panel cover subassembly.

8. The integrated drive panel as claimed in claim 2, wherein the panel cover subassembly includes a handle for grasping the panel cover subassembly to slide the panel cover subassembly between the latched and unlatched position for tool-less removal of the integrated drive panel.

9. The integrated drive panel as claimed in claim 2, wherein the panel cover subassembly is a first panel cover subassembly, the integrated drive panel further comprising a second panel cover subassembly disposed in a same plane as the first panel cover subassembly.

10. The integrated drive panel as claimed in claim 9, wherein the first panel cover subassembly is configured to slide toward the second panel cover subassembly into the unlatched position, and the first panel cover subassembly is configured to slide away from the second panel cover subassembly into the latched position.

11. The integrated drive panel as claimed in claim 2, wherein the computer case comprises a front bezel having an opening formed therein for providing access to the peripheral/drive bay, and wherein the panel cover subassembly comprises a tab for engaging the bezel along an edge of the opening.

12. The integrated drive panel as claimed in claim 11, wherein the EMI shield is inserted through the opening when the integrated drive panel is installed in the peripheral/drive bay.

13. The integrated drive panel as claimed in claim 11, wherein the cover assembly is substantially flush with the front bezel when the integrated drive panel is installed in the peripheral/drive bay.

14. The integrated drive panel as claimed in claim 2, wherein the computer case comprises a back panel including an access port for an expansion card slot, and a front bezel oriented generally parallel to and apart from the back panel, the peripheral/drive bay being accessed via the front bezel.

15. The integrated drive panel as claimed in claim 1, wherein the EMI shield comprises:
a plate portion coupled to the cover assembly; and
a plurality of fingers extending from the plate portion for engaging the computer case.

16. The integrated drive panel as claimed in claim 1, wherein the EMI shield is formed of spring steel.

17. A computer case, comprising:
a peripheral/drive bay for receiving a peripheral device in the computer case;
a front bezel having an opening formed therein for providing access to the peripheral/drive bay
an integrated drive panel for enclosing the peripheral/drive bay when the peripheral/drive bay is empty, the integrated drive panel including:
a cover assembly for at least partially covering the opening when the peripheral/drive bay is empty, the cover assembly including first and second panel cover subassemblies slidable between a latched position wherein the first and second panel cover subassemblies are moved away from each other for engaging the bezel and an unlatched position wherein the first and second panel cover subassemblies are moved toward each other so that the integrated drive panel may be removed from the drive bay; and
an EMI shield assembly coupled to the cover assembly for reducing EMI emissions through the opening,
wherein the cover assembly engages the bezel for holding the EMI shield within the peripheral/drive bay.

18. The computer case as claimed in claim 17, wherein the cover assembly comprises:
a frame member; the first and second panel cover subassemblies being coupled to the frame member, and slidable on the frame member between the latched position and the unlatched position.

19. The computer case as claimed in claim 18, wherein the EMI shield is metal and the first and second panel cover subassemblies comprise a non-metallic material.

20. The computer case as claimed in claim 18, wherein the cover assembly further comprises a spring member for biasing the first and second panel cover subassemblies to the latched position.

21. The computer case as claimed in claim 20, wherein the EMI shield is metal, the first and second panel cover subassemblies comprise a non-metallic material, and the spring member is formed from said non-metallic material.

22. The computer case as claimed in claim 20, wherein the first and second panel cover subassemblies each include a handle for grasping the panel cover subassemblies to slide the panel cover subassemblies to the unlatched position.

23. The computer case as claimed in claim 22, wherein the handles comprise dimples formed in the first and second panel cover subassemblies.

24. The computer case as claimed in claim 20, wherein the first and second panel cover subassemblies each include a handle for grasping the panel cover subassemblies to slide the panel cover subassemblies between the latched and unlatched position for tool-less removal of the integrated drive panel.

25. The computer case as claimed in claim 20, wherein the second panel cover subassemblies are disposed in a same plane as the first panel cover subassembly.

26. The computer case as claimed in claim 25, wherein the first panel cover subassembly is configured to slide toward the second panel cover subassembly into the unlatched position, and the first panel cover subassembly is configured to slide away from the second panel cover subassembly into the latched position.

27. The computer case as claimed in claim 18, wherein each of the first and second panel cover subassemblies comprises a tab for engaging the bezel along an edge of the opening.

28. The computer case claimed in claim 27, wherein the EMI shield is inserted through the opening when the integrated drive panel is installed in the peripheral/drive bay.

29. The computer case as claimed in claim 18, wherein the cover assembly is substantially flush with the front bezel when the integrated drive panel is installed in the peripheral/drive bay.

30. The computer case as claimed in claim 17, wherein the EMI shield comprises:
   a plate portion coupled to the cover assembly; and
   a plurality of fingers extending from the plate portion for engaging the computer case.

31. The computer case as claimed in claim 17, wherein the EMI shield is formed of spring steel.

32. The computer case as claimed in claim 17, further comprising a back panel including an access port for an expansion card slot, the front bezel being oriented generally parallel to and apart from the back panel, the peripheral/drive bay being accessed via the front bezel.

33. An integrated drive panel for a peripheral/drive bay in a computer case, comprising:
   means for covering the peripheral/drive bay when the peripheral/drive bay is empty, the covering means being slidable between a latched position wherein the covering means engages the computer case and an unlatched position wherein the integrated drive panel may be removed from the drive bay; and
   means coupled to the covering means for reducing EMI emissions through the peripheral/drive bay,
   wherein the covering means engages the computer case for holding the EMI emissions reducing means within the peripheral/drive bay.

34. The integrated drive panel as claimed in claim 33, wherein the computer case comprises a front bezel having an opening formed therein for providing access to the peripheral/drive bay, and wherein the EMI emissions reducing means is inserted through the opening when the integrated drive panel is installed in the peripheral/drive bay.

35. The integrated drive panel as claimed in claim 34, wherein the covering means is substantially flush with the front bezel when the integrated drive panel is installed in the peripheral/drive bay.

36. An integrated drive panel for a peripheral/drive bay in a computer case, comprising:
   a cover assembly for at least partially covering the peripheral/drive bay when the peripheral/drive bay is empty, the cover assembly including a frame member and a panel cover subassembly being coupled to the frame member, the panel cover subassembly being slidable on the frame member between a latched position wherein the panel cover subassembly engages the computer case and an unlatched position wherein the integrated drive panel may be removed from the drive bay; and
   an EMI shield assembly coupled to the cover assembly for reducing EMI emissions through the peripheral/drive bay,
   wherein the cover assembly engages the computer case for holding the EMI shield within the peripheral/drive bay.

* * * * *